Patented Apr. 23, 1929.

1,710,197

UNITED STATES PATENT OFFICE.

FREDERICK W. SKIRROW AND GEORGE O. MORRISON, OF SHAWINIGAN FALLS, QUEBEC, CANADA, ASSIGNORS TO CANADIAN ELECTRO PRODUCTS COMPANY LIMITED, OF MONTREAL, CANADA.

MANUFACTURE OF VINYL ESTERS.

No Drawing.    Application filed November 8, 1926.    Serial No. 147,188.

This invention relates broadly to improvements in the manufacture of vinyl esters and more particularly to improvements in the process disclosed in application Serial Number 422,693, filed November 8th, 1920, and the object of the invention is to provide a process of making vinyl esters from acetylene and carboxylic acids which gives a maximum yield with minimum production of by-products.

It is known that acetylene in the presence of certain catalysts, such as mercury compounds, will combine with carboxylic acids to yield di-esters of hypothetical ethylidene glycol and that in such a reaction a certain amount of vinyl ester is often produced. The difficulty in carrying out the process, as far as the production of vinyl esters is concerned, is to minimize the production of the ethylidene products and to secure as large a yield as possible of the vinyl ester. The use of sulphuric acid in preparation of the catalyst, although satisfactory for the production of ethylidene diacetate, is not satisfactory for the production of the vinyl ester. Syrupy phosphoric acid has been used in the production of vinyl acetate from ethylidene diacetate, but yields higher than have been thus obtained are desirable for satisfactory commercial operation. In the processes as formerly conducted, mixtures of ethylidene diacetate and vinyl ester have resulted, in which the former predominates.

It has been discovered that ordinary commercial phosphoric acid, being often a mixture of the various phosphoric acids, is unsatisfactory for the production of vinyl esters and it has also been discovered that to obtain a maximum yield of vinyl ester with a minimum yield of ethylidene di-ester, ortho-phosphoric acid must be utilized and that the presence of any other phosphoric acid is detrimental to the yield of vinyl ester. Furthermore, it is found desirable to utilize 98% to 100% ortho-phosphoric acid to obtain the best results, but it has also been discovered that pure ortho-phosphoric acid may be diluted to, say, 60% and if used immediately will still give good yields of vinyl ester, whereas if boiled and/or allowed to stand for some time or if ordinary 60% commercial phosphoric acid is used, the yield is greatly reduced. This is presumed to be due to the formation of hydrates of the acid higher than $H_3PO_4$.

The preferred method of preparing the phosphoric acid to be utilized in this process is to concentrate dilute ortho-phosphoric acid to 98% to 100% strength, being careful not to overheat it during the process of concentration, so as to avoid the formation of other acids such as pyro- or meta-phosphoric acids.

The invention therefore resides, broadly speaking, in the preparation of the catalyst in a suitable physical condition in glacial acid, such as acetic acid, and the passage of an excess of acetylene into this product at a suitable temperature to give high yields of vinyl ester. The temperature range in general should preferably be under the boiling point of the acid and, for the production of vinyl acetate, the preferable range is from 40°–90°. The vinyl ester contained in the exit gases passes in the excess of acetylene through a suitable rectifying column and fractional condensation chamber such that the acid is returned to the reaction vessel and the vinyl ester, mixed with some small amount of acid, is condensed and separated. The apparatus for the production of vinyl ester may be also suitably connected, if desired, to a continuous still in such a way that the vinyl ester is recovered and the unchanged acetic returned to the reaction vessel.

The preparation of the catalyst is preferably carried out by dissolving a mercury oxide in a great excess of glacial carboxylic acid and then ortho-phosphoric acid is added in sufficient amount to precipitate the mercury salt. This precipitation may be done at a temperature below the boiling point of the acid used. The ortho-phosphoric acid is preferably present in excess over that required to precipitate the mercury salt but may go as high as three or four times that required for this purpose with good results; on the other hand, only sufficient to precipitate the mercury salt may be added, which also gives satisfactory results. Excess phosphoric acid gives a more rapid reaction, however, than if only sufficient is added to precipitate the mercury salt. The yields are unaffected.

The following examples are given as illustrative of the invention, but it is understood that the invention is not limited to the temperature or other conditions employed which may be varied to suit the carboxylic acid utilized, but the process broadly covers a method for the manufacture of vinyl esters utilizing as catalysts mercury salts of ortho-phosphoric acid, with or without excess of this acid present.

Example I.

3 parts of mercuric oxide is dissolved in 100 parts of hot glacial acetic acid. This material is kept at 80°–90° C. and 2.4 parts of pure ortho-phosphoric acid of 98% to 100% concentration is added, with agitation. This material is then put into a suitable vessel connected to suitable refluxing and fractional condensation apparatus, or connected to a continuous still arranged as aforesaid. An excess of acetylene is passed in and the temperature is maintained at 78° C. approximately. A vigorous reaction ensues, with liberation of heat. Some acetic acid is carried over by the acetylene and may be returned to the reaction vessel by any suitable means. The vinyl acetate carried over is condensed and removed from the sphere of reaction. The unchanged acetylene is returned to the reaction vessel. This is continued until the reaction slackens, with the result that there is obtained a yield of vinyl ester of approximately 95% to 98% of the theoretical based on the acetic acid reacting with a yield of from 2% to 3% of ethylidene diacetate.

In the above example, no tar formation occurs such as is found in the utilization of sulphuric anhydride.

Example II.

2.3 parts of mercuric oxide is dissolved in 100 parts of glacial formic acid. 1.85 parts of 98% to 100% pure ortho-phosphoric acid are added, with agitation, and the material is treated in a similar manner to Example I at a temperature of approximately 70° C. Yields are obtained similar to those given in Example I.

Example III.

Butyric acid may be utilized with procedure similar to that of Example I, except that the proportions of mercury salt and ortho-phosphoric acid are changed in the ratio of the molecular weight of acetic acid to that of butyric acid. Similar yields of the vinyl ester of butyric acid are obtained.

Other carboxylic acids may be utilized as outlined above with suitable variations of temperature and proportions of the catalyst.

In the foregoing description and following claims, the word "dissolved" used in reference to mercury oxide is used as is customary in such cases in a broad sense to indicate the appearance of solution, it being well known that mercury oxide is in fact insoluble in the acid but reacts readily therewith to produce a soluble salt.

Having thus described our invention, what we claim is:—

1. A process of making vinyl esters from the corresponding carboxylic acids, which includes passing acetylene into said acids in presence of a mercury salt of ortho-phosphoric acid free from mercury salts of other phosphoric acids.

2. A process of making vinyl esters from the corresponding carboxylic acids, which includes passing acetylene into said acids in presence of ortho-phosphoric acid and a mercury salt of ortho-phosphoric acid.

3. A process of making vinyl esters from the corresponding carboxylic acids, which includes passing acetylene into said acids in presence of a mercury salt of ortho-phosphoric acid formed in situ by interaction of ortho-phosphoric acid on a mercury oxide dissolved in the carboxylic acid.

4. In a process of making vinyl esters by interaction of acetylene and carboxylic acids, the steps of dissolving a mercury oxide in the carboxylic acid which is to be treated and reacting on the dissolved oxide with ortho-phosphoric acid of 98% to 100% concentration.

5. In a process of making vinyl esters by interaction of acetylene and carboxylic acids, the steps of dissolving a mercury oxide in the carboxylic acid which is to be treated, and reacting on the dissolved oxide with a molecular excess of ortho-phosphoric acid.

6. A process of making vinyl acetate, which comprises passing acetylene into acetic acid in presence of a mercury salt of ortho-phosphoric acid free from mercury salts of other phosphoric acids.

7. A process of making vinyl acetate, which comprises passing acetylene into acetic acid in presence of ortho-phosphoric acid and a mercury salt of ortho-phosphoric acid.

8. In a process of making vinyl acetate by interaction of acetylene and acetic acid, the steps of dissolving an oxide of mercury in the acetic acid and reacting on the oxide with ortho-phosphoric acid.

9. As catalyst for the manufacture of vinyl esters by interaction of acetylene and carboxylic acids, mercury salts of ortho-phosphoric acid, when prepared by interaction of ortho-phosphoric acid with oxides of mercury dissolved in carboxylic acids.

10. As catalyst for the manufacture of vinyl esters by interaction of acetylene and carboxylic acids, mercury salts of ortho-phosphoric acid free from mercury salts of other phosphoric acids.

11. As catalyst in the manufacture of vinyl esters by interaction of acetylene and carboxylic acids, mercury salts of ortho-phosphoric acid admixed with free ortho-phosphoric acid and free from other phosphoric acids and mercury salts thereof.

12. A process of making vinyl esters from the corresponding carboxylic acids which comprises dissolving an oxide of mercury in said acids, reacting on the dissolved oxide with phosphoric acid, and passing acetylene into the liquor.

13. A process of making vinyl esters from the corresponding aliphatic monocarboxylic acids, which includes passing acetylene into said acids in presence of a mercury salt of ortho-phosphoric acid free from mercury salts of other phosphoric acids.

14. A process of making vinyl esters from the corresponding aliphatic monocarboxylic acids, which includes passing acetylene into said acids in presence of ortho-phosphoric acid and a mercury salt of orthophosphoric acid.

In witness whereof, we have hereunto set our hands.

FREDERICK W. SKIRROW.
GEORGE O. MORRISON.